US008879759B2

(12) United States Patent
Wells

(10) Patent No.: US 8,879,759 B2
(45) **Date of Patent: *Nov. 4, 2014**

(54) WIRELESS SPEAKER FOOTWEAR

(75) Inventor: John Andrew Wells, Paradise Valley, AZ (US)

(73) Assignee: J. A. Wells & Associates, L.L.C., Paradise Valley, AZ (US)

( * ) Notice: Subject to any disclaimer, the term of this patent is extended or adjusted under 35 U.S.C. 154(b) by 863 days.

This patent is subject to a terminal disclaimer.

(21) Appl. No.: 13/066,547

(22) Filed: Apr. 19, 2011

(65) Prior Publication Data

US 2011/0306299 A1 Dec. 15, 2011

Related U.S. Application Data

(63) Continuation-in-part of application No. 12/802,733, filed on Jun. 14, 2010, now Pat. No. 8,638,958.

(51) Int. Cl.

| | |
|---|---|
| *H04R 5/02* | (2006.01) |
| *H04B 5/00* | (2006.01) |
| *H04R 1/02* | (2006.01) |
| *A43B 23/00* | (2006.01) |
| *A43B 23/08* | (2006.01) |
| *A43B 3/00* | (2006.01) |
| *A43B 1/00* | (2006.01) |

(52) U.S. Cl.

CPC ............... *A43B 1/0072* (2013.01); *A43B 23/08* (2013.01); *H04R 2420/07* (2013.01); *A43B 3/0021* (2013.01); *H04R 2201/023* (2013.01); *A43B 3/0015* (2013.01); *H04R 1/028* (2013.01)

USPC ................ 381/301; 381/79; 381/333; 36/139

(58) Field of Classification Search

CPC ...... A43B 3/0005; A43B 3/00; A43B 3/0021; A43B 3/0015; A43B 1/0054; A63B 2225/50; A63B 5/6807; A63B 2420/07; H04R 2420/09; H04R 2201/023; Y10S 482/901; H04M 1/6066; H04M 2250/02; G10H 2220/321

USPC ................................................ 381/77, 82, 85

See application file for complete search history.

(56) References Cited

U.S. PATENT DOCUMENTS

| | | | |
|---|---|---|---|
| 5,345,700 | A | 9/1994 | Norment |
| 5,461,188 | A | 10/1995 | Drago et al. |

(Continued)

OTHER PUBLICATIONS

Reviews.cnet.com/mp3-players/dada-footwear-code-m/4505-64p1,CNET editors review,Troy Dreier, Dada Footwear Code M/BBS, pp. 1-3.

(Continued)

*Primary Examiner* — Ping Lee
(74) *Attorney, Agent, or Firm* — Eugene H. Eickholt

(57) ABSTRACT

Digital musical footwear is disclosed having hidden compartments which house a thin integrated multi-plane electronic circuit board assembly (2) and a rechargeable lithium ion battery pack. A transmitter antenna is attached to a hand held device such as a smart phone which antenna sends wireless short wave sound signals to a receiving antenna part of the circuit board assembly. Multiple mini-speakers (6, 7) are footwear mounted to play the music. Bluetooth® version 4.0 wireless protocol technology is employed in the circuit board assembly. The circuit board can be flat and hidden in a recess of a heel or curved and hidden in a wall recess of the footwear as can the battery pack. Advanced lithium ion batteries such as silicon wafer or silicon core-shell nanowire batteries may be used to reduce battery weight. Flexible flat speakers (65) such as the FleXpeaker® may also be used to further reduce weight.

20 Claims, 10 Drawing Sheets

(56) References Cited

U.S. PATENT DOCUMENTS

| | | | |
|---|---|---|---|
| 6,608,907 B1 | 8/2003 | Lee | |
| 7,412,294 B1 | 8/2008 | Woolfork | |
| 7,623,077 B2 | 11/2009 | Wang et al. | |
| 7,623,078 B2 | 11/2009 | Wang | |
| 8,161,664 B1 | 4/2012 | Dawson | |
| 8,253,586 B1 * | 8/2012 | Matak | 340/870.07 |
| 8,638,958 B2 * | 1/2014 | Wells | 381/301 |
| 2005/0091884 A1 * | 5/2005 | Omstead et al. | 36/137 |
| 2006/0004263 A1 * | 1/2006 | Feliss et al. | 600/300 |
| 2006/0132314 A1 | 6/2006 | Sok | |
| 2008/0044052 A1 | 2/2008 | Whipple | |
| 2008/0143610 A1 * | 6/2008 | Wang et al. | 343/702 |
| 2008/0167741 A1 | 7/2008 | Lay et al. | |
| 2008/0306410 A1 * | 12/2008 | Kalpaxis et al. | 600/592 |
| 2009/0120705 A1 * | 5/2009 | McKinzie | 180/181 |
| 2009/0151043 A1 | 6/2009 | Moreshead | |
| 2009/0288317 A1 | 11/2009 | Forbes | |
| 2009/0298420 A1 | 12/2009 | Haartsen et al. | |
| 2010/0166230 A1 | 7/2010 | Tseng et al. | |
| 2011/0054359 A1 * | 3/2011 | Sazonov et al. | 600/595 |
| 2011/0255721 A1 * | 10/2011 | Chen et al. | 381/191 |
| 2011/0309306 A1 * | 12/2011 | Zhou et al. | 252/500 |

OTHER PUBLICATIONS jr.com/audioengine/pe/Aug-AWI, Audioengine W1 (AWI)—Premium Wireless Audio adapter in Computer Cable Adapters and Switches, pp. 1-2.

whatsoniphone.com/blogs/accessory-review-audioengine,Audioengine AW2 Accessory Review—Audioengine AW2 Wireless Adapter for iPod, pp. 1-3.

Silicon Strategy Shows Promis for Batteries:Lithium-Ion Technique for Electric Cars, Large-Storage, Science Daily, Oct. 13, 2010, pp. 1-2.

physorg.com/news117212815.html, Nanowire battery holds 10 times the charge of existing ones, Dec. 18, 2007 pp. 1-2.

physorg.com/news151667477, Laura Mgrdichian, 'Core-Shell' Silicon Nano Wires May Improve Lithium-Ion Batteries, pp. 1-2.

* cited by examiner

WIRELESS SPEAKER FOOTWEAR

This application is a continuation-in-part of U.S. application Ser. No. 12/802,733, filed Jun. 14, 2010 now U.S. Pat. No. 8,638,958, entitled SPEAKZ SHOES which application is herein incorporated by reference.

FIELD OF INVENTION

The present invention to musical footwear incorporates in the shoe a Bluetooth® wireless protocol compatible multi-level integrated circuit board assembly having a wireless audio Bluetooth enabled receiver antenna, an amplifier, mini-speaker connections, an on/off switch connection cord and a USB port for charging a battery source. The battery source powers the circuit board assembly to provide power to the shoe mounted receiver antenna, amplifier and to mini-speakers mounted on or in the footwear. The battery source is concealed in a compartment in the footwear along with or separate from the circuit board assembly. An external Bluetooth enabled music source which can be hand held transmits a Bluetooth wireless music signal to the receiver antenna.

BACKGROUND OF THE INVENTION

The desirability of playing sounds such as music or instructions through small speakers mounted in or on footwear such as shoes or boots are well known. Various music sources such as an MP3 player, recordable microchip, integrated memory device or microprocessor with a ROM memory have been proposed for placement in shoes. This placement can subject these expensive components to damage from dirt, water, vibration and shock when the foot wearer is engaged for example in a running activity. Music source devices in or on a footwear also adds undesirable weight and bulkiness to the footwear.

The present invention avoids these drawbacks by use of a music source having audio playing capabilities which is easily hand held. Recent hand held devices often have built in Bluetooth technology. For older hand held devices, an inexpensive Bluetooth enabled audio adapter antenna is connected to an existing USB port or mini USB port on the music source to wirelessly transmit Bluetooth® sound signals to the Bluetooth® wireless protocol compatible multi-level integrated circuit board assembly located in the footwear. A tiny amplifier integrated with the circuit board enhances mini-speaker performance. Sound volume may be either controlled by the hand held device or by a volume control feature on the mini-speakers.

The hand held music source may be a smartphone. Exemplary kinds of smart phones include but are not limited to a Droid® phone or a HTC EVO 4G Android® phone. Other examples of music sources include but are not limited to any iPhone®, iPad®, iPad Nano®, iPod®, iPad 3G®, iPad Shuffle®, iPad Touch®, iPad Tablet®, iPod Touch®, MP3 player, CD player, microchip player, laptop computer or computer. Other examples of the hand held device include personal digital assistant (PDA) and the Touch Pad®. Use of already owned hand held music sources greatly reduces the cost of this invention to the footwear owner.

DESCRIPTION OF THE PRIOR ART

One known speaker shoe product is the Dada Code M® basketball shoes featuring built-in speakers in each shoe. A MP3 player having prerecorded sound tracks from a Macintosh® or Windows® computer is embedded in the sole of the right shoe. The MP3 player serving as the music source wirelessly sends music to the left shoe's speakers or to a speaker headset. The Dada Code M® shoes had drawbacks such as limited battery life and only 128 MB storage capacity. Speaker size also contributed to unwanted weight and bulkiness of the footwear.

The following U.S. patents were found in a prior art search of speaker footwear:

| U.S. Pat. No. | INVENTOR | ISSUED |
|---|---|---|
| 5,345,700 | Norment | 13 Sep. 1994 |
| 5,461,188 | Drago et al | 24 Oct. 1995 |
| 5,615,111 | Raskas et al | 25 Mar. 1997 |
| 7,531,939 | Takiguchi | 12 May 2009 |
| 7,623,077 | Wang et al | 24 Nov. 2009 |
| 7,623,078 | Wang | 24 Nov. 2009 |

U.S. Pat. No. 5,345,700 to Norment discloses an integral unitary assembly slipped into a side pocket of a shoe. The assembly includes an audio speaker, battery and microchip which can be activated to play a musical composition.

U.S. Pat. No. 5,461,188 to Drago et al discloses a sound system incorporate into articles of clothing such as footwear. The system plays preprogrammed music in one embodiment using a memory circuit which can be preprogrammed for new music. The shoes in one embodiment may display light patterns to illuminate in synchrony with the rhythmic beat of either an external or internal music or sound program.

U.S. Pat. No. 5,615,111 to Raskas et al discloses a sound system using record and playback circuits with a memory incorporated in a shoe to store the recorded music and play the same through a speaker. Both the memory and a battery mounted in the shoe may be removed to change the music program and recharge the battery. Also incorporated in the shoe are a microcontroller and several switches to control the operating mode and the power on/off from the battery to the microcontroller.

U.S. Pat. No. 7,531,989 to Takiguchi discloses sending a wireless signal from a hand held device such as a portable telephone to a speaker headset. A bimorph having piezoelectric plates located in the soles of a pair of shoes provides an electrostatic field formed on a living body to receive acoustic data which is amplified to provide the feeling of sound through the soles of the feet by using an acoustic piezoelectric vibrator speaker as a diaphragm while simultaneously listening to sound through the headset speaker. Movement of the wearer of the shoes generates electrical power transmitted by the bimorph which power is stored by a capacitor and used to provide bodily sensation to the soles of the wearer.

U.S. Pat. No. 7,623,078 to Wang discloses a plug-in antenna adapter for use with hand held portable devices. In one embodiment, a compact portable wireless pedometer is placed under the sole of a runner's shoe to wirelessly transmit information to the portable device using the antenna adapter to receive information about steps a runner is taking. The adapter is used to provide wireless transmit and receive functions for audio and visual devices including cellular telephones, wireless media players, wireless speakers and hand held computers. U.S. Pat. No. 7,623,077 to Wang et al discloses a transceiver antenna and printed circuit board placed in the shoe.

Also found in the prior art search was U.S. Patent Application Publication No. U.S. 2006/0101674 filed May 18, 2006 by Ungari and now abandoned. This publication discloses use of a molded lithium ion battery mounted on or in a shoe made to conform to either the upper heel or sole assembly. Light elements formed as a woven fabric were mounted integral with the shoe and powered by this lithium ion battery.

Also found in the prior art search was PCT Application PCT/US06/45746 to Lay et al which discloses a data system having an electronic module in a shoe sole's shank. The electronic module includes a microprocessor in electronic communication with a data storage device, a rechargeable battery, a decoding device to convert digital data to analog data and a wireless data link. Each shoe has speakers for playing sounds stored in the data storage device. A USB port is located in the rear heel of the shoe to allow battery recharging. Data such as MP3 music program files are inputted to a ROM chip within the data storage device. In one embodiment, a wireless link is used in both shoes to send data from the first shoe to the second shoe to enable stereo music to be played. In another embodiment the wireless link is used to send music to a headset for private listening enjoyment.

Also found in the prior art search was U.S. Patent Application Publication No. 2010/0166230 filed Apr. 6, 2009 by Tseng et al. This publication discloses use of a solar powered FleXpeaker® wherein a wireless sound signal is transmitted from a hand held device to controlling integrator circuitry which controls an upper electrode and a chamber mounted diaphragm and diaphragm electrode to vibrate together according to filled electrical charges and a voltage of input audio signals thereby generating sound output by compressing nearby air. The materials used for the electrodes and diaphragm are flexible and extremely thin. A single integrator may control multiple flat or flat rolled speakers. The diaphragm is made of a static charge retaining dielectric material produced to have pores having micrometer or nanometer diameters. This permits piezoelectric properties to be controlled by corona charging to generate dipolar charges in the dielectric material of the diaphragm. The components of the flat speakers are made of extremely light weight, thin and flexible materials.

Also found in the prior art search was U.S. Patent Application Publication No. 2009/0298420 filed Jul. 9, 2008 by Haartsen et al. This publication discloses a wireless audio data distribution system which system is a Bluetooth piconet. The system uses a Bluetooth enabled smartphone to wirelessly transmit audio signals to either a stereo headset or a plurality of stand alone stereo speakers. The speakers synchronize the start of signal decoding of received audio data and compensate for relative skew overtime of internal clocks in the speakers in response to occurrence of timing events that are defined relative to signals from the wireless network.

SUMMARY OF THE INVENTION

It is the primary object of the invention to provide a slim and light weight integrated multi-level circuit board assembly small enough to fit in a compartment under the sole portion of the footwear or vertically in the rear heel wall above the sole of the footwear. This circuit board assembly includes a wireless Bluetooth enabled receiver antenna in communication with one or more sound signal amplifiers which are integrated with the circuit board. Mini-speakers closest to the amplifiers may be connected directly to the circuit board amplifiers so as to eliminate the need for a wiring harness for each speaker. However a wiring harness may be used depending on the distance from the amplifiers.

It is a further object of the invention to use a slim rechargeable lithium ion battery pack hidden below the sole in the rear heel or in a vertical heel wall above the sole of the footwear to provide power to the above mentioned circuit board components and mini-speakers.

It is a further object of the invention to provide as part of the integrated circuit board assembly a power on/off switch connection receiver for a remote on/off power switch assembly to control power to the circuit board and conserve battery life.

It is a further object of the invention to provide a USB battery charging port connection as part of the integrated circuit board assembly.

It is a further object of the invention to enable the speaker shoe wearer to make cost effective use of already owned myriad of hand held sound playing devices. This may be accomplished by plugging into an USB port of the hand held device a compatible audio adapter transmitter antenna. This has the advantage of the hand held device's battery being the source for the transmitter antenna's power. Additionally, the controls of the volume of the hand held device may be utilized to set a desired sound volume being transmitted by the footwear's mini-speakers.

It is a further object of the invention to enable wireless transfer of stereo music from a hand held music source to multiple mini-speakers embedded in a pair of shoes.

Yet another object of the invention is to play stereo music having volume controllable up to an effective range of 100 feet free of static, noise, signal drop out and signal interference.

It is a further object of the present invention to miniaturize the size and weight of the integrated circuit board, speakers and battery pack so as to avoid the bulkiness of prior art speaker shoes. To achieve these ends, improvements in lithium ion battery design and speaker reduction weight are incorporated in some embodiments of this invention. This miniaturization enhances the appeal of the invention for use with sports footwear with basketball shoes and roller blade skates being examples thereof. Highly miniaturized components of the invention permit the incorporation of the invention in stylish women's footwear.

Yet a further object of the invention is to provide a shape conforming curved multi-planed integrated circuit board assembly and a companion shape conforming curved multi-planed lithium ion battery pack suitably miniaturized to fit in a lady's fashionable footwear. This miniaturization permits one or both curved the circuit board assembly and the lithium ion battery pack to be hidden in the spiked heel of a ladies high heel shoe. Also, a thin curved circuit board assembly can be placed in a vertical recess located in a wall of the rear of a footwear heel above the sole of the footwear to avoid putting pressure on the circuit board assembly.

It is a further object of the invention to free the speaker shoe wearer from having to use an earphone speaker so as to avoid creating a safety hazard caused by blocking the ear drums by wearing an earphone or ear pod.

It is a further object the invention to have mini-speakers in only one footwear with the other footwear having hidden weights distributed beneath the sole pad to give a balanced feel to the footwear pair.

It is a further object of the invention to provide a miniaturized integrated circuit board assembly and a miniaturized battery pack which allows mini-speakers to be remotely mounted in a toe area and an ankle leg support area of a shoe wearer. Harness wires carry power and sound signals to these remotely spaced mini-speakers.

Other objects and advantages of the present invention will become apparent from the subsequent detailed description of the preferred embodiments and the appended claims taken in conjunction with the accompanying drawings.

DETAILED DESCRIPTION OF THE INVENTION

Figure 1:
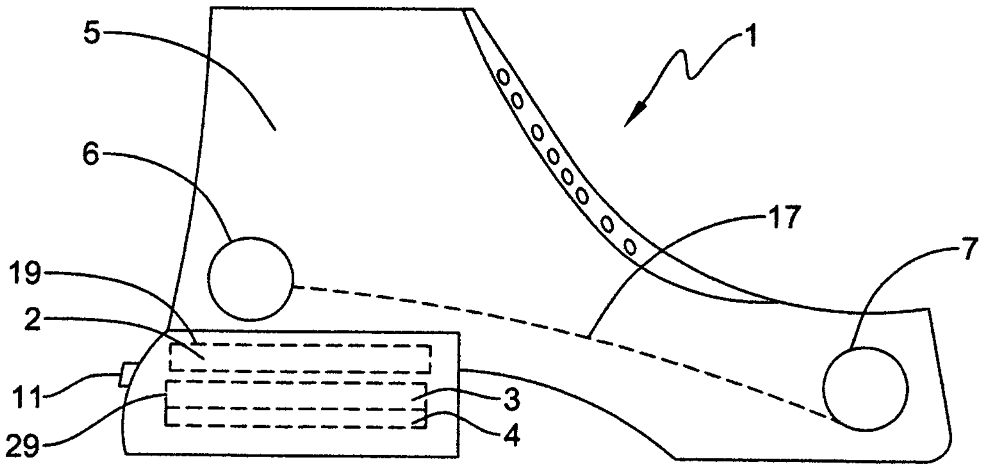
FIG. 1 is a side view of a left side of an athletic shoe showing an integrated circuit board assembly and a hidden battery pack both hidden in recesses in the heel of the footwear.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an", and "the" are intended to include the plural forms as well, unless the context clearly indicates otherwise. The term "and/or" and "/" includes any and all combinations of one or more of the associated listed items. In the drawings, the size and relative sizes of regions may be exaggerated for purposes of clarity. Like numbers refer to like elements throughout.

Figure 2:
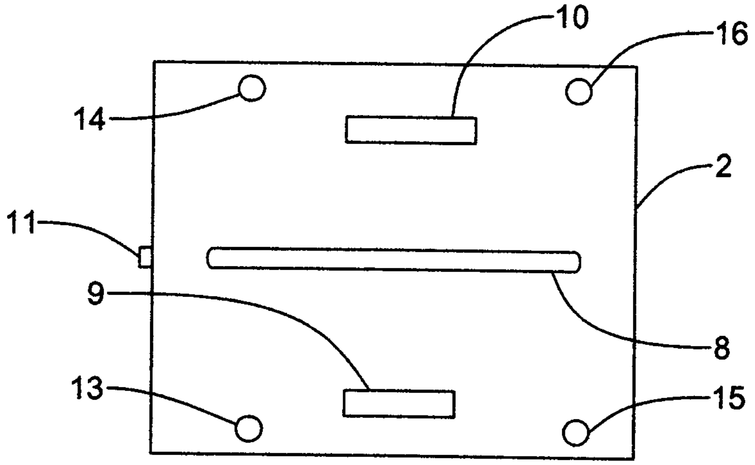
FIG. 2 is a top view of the integrated circuit board assembly removed from the heel of FIG. 1 showing an integrated Bluetooth enabled audio receiver antenna 8 extending in a longitudinal direction of the footwear.

Referring to FIG. 1, an article of footwear is depicted in the exemplary form of an athletic shoe 1. A flat thin integrated circuit board assembly 2 having microelectronic components control circuit functions disclosed in FIG. 14. The assembly is made multi-planar to fit compactly in a cavity or recess 19. The length and width dimensions of the circuit board assembly 2 shown in FIG. 2 are roughly the size of a credit card (about 8.5 cm. by 5.5 cm. with a thickness of about 0.5 cm). A first mini-speaker 6 is mounted on the athletic shoe 1 on an ankle wall of the heel 5. Mini-speaker 6 is connected directly to the circuit board assembly 2 with a second mini-speaker 7 located near the toe area connected to the circuit board assembly by a wiring harness 17. This arrangement provides a stereo sound effect. Power to drive the circuit board assembly circuits and the mini-speakers is provided by a battery pack having two stacked rechargeable lithium ion batteries 3 and 4 hidden in a cavity or recess 29. A single battery may also be used. A third mini-speaker (not shown) may be mounted on the right side of the shoe opposite mini-speaker 6 with a similar fourth mini-speaker (not shown) mounted opposite the toe mini-speaker 7. A shoe pair may have up to eight mini-speakers for maximum stereo sound when mini-speakers are mounted on both shoes.

In this invention, Bluetooth uses a wireless protocol to stream stereo audio data from an audio source device to a plurality of physically separated speakers which with the audio source constitute a piconet. As mini-speakers on one shoe are physically separated from the mini-speakers on the other shoe, each circuit board assembly includes control circuitry in each shoe having internal clocks designed to permit a slight time delay on the order of a few microseconds in playing music signal packets. An example of such time delay circuitry is disclosed in the Haartsen et al U.S. Patent Application Publication No. 2009/0298420 the disclosure of which is hereby incorporated by reference. Speakers through use of internal clock circuitry and Bluetooth enabled transceivers synchronize the start of received stereo audio data and compensate for relative skew over time of transceiver circuitry in response to occurrence of timing events that are defined relative to signaling from the audio source. A common network clock is established that is timed relative to defined repetitively occurring signals of the Bluetooth piconet. An adjusted clock signal is generated that is time offset a controllable amount relative to the local clock signal. This time offset can be defined to align the adjusted clock signal with signaling of the Bluetooth piconet.

Figure 17:
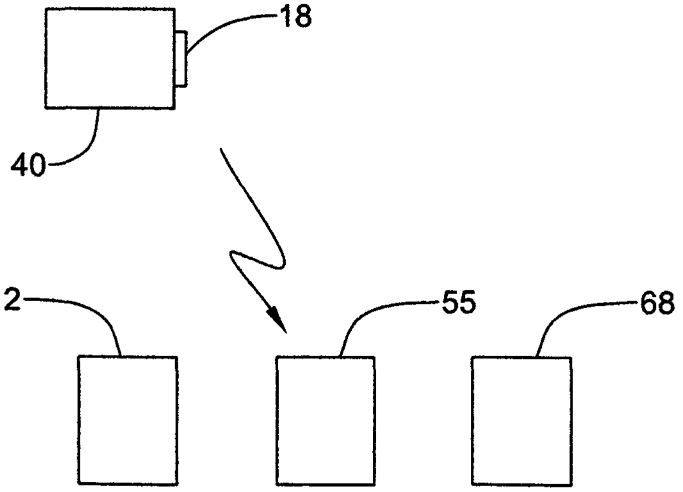
FIG. 17 is a logic diagram showing an audio distribution system for a wireless Bluetooth piconet.

Such time alignment circuitry is used in this invention to synchronize the timing of the audio output from a plurality of mini-speakers and also to maintain frequency hop synchronicity between the audio source device 40 and the mini-speakers on each shoe. An audio distribution system in the form of a Bluetooth piconet is thus formed as shown in the FIG. 17 signal flow diagram of this invention.

A less expensive approach is to employ just two mini-speakers on one shoe. The two mini-speakers can be on each side of the shoe or both on one side with the choice being mostly one of esthetics. Having the mini-speakers on each side is preferred for a more balanced feel. Weights (not shown) can be placed in the non-music playing shoe at appropriate locations to give the shoe pair a balanced weight. A fake exterior giving the non-music playing shoe the same appearance as the mini-speaker shoe may be employed.

Figure 3:
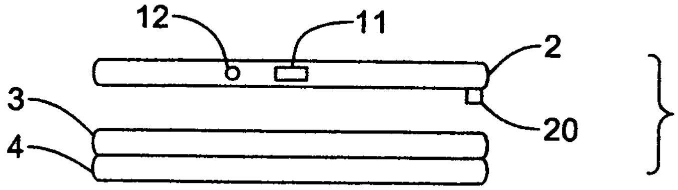
FIG. 3 is an exploded rear view of the integrated circuit board assembly and battery pack with both removed from the shoe heel of FIG. 1.

In the embodiment of FIGS. 1-3, a Bluetooth enabled antenna 8 is centered in a direction extending length wise of the circuit board assembly 2. Sound amplifiers 9 and 10 form part of the integrated circuit board assembly and are located on either side of the antenna 8. In a preferred form only one amplifier is needed to output sound signals to two or more mini-speakers located on one shoe. The amplifier may be in the form of a sub-woofer. Rear connectors 13 and 14 form part of the integrated circuit board assembly 2 to provide direct connection to rear mini-speakers such as mini-speaker 6. Front connectors 15 and 16 also form part of the integrated circuit board 2. These connectors allow connection with forwardly mounted mini-speakers such as mini-speaker 7. Spaced at the rear edge of the circuit board 2 is a power on/off switch connection 11 used to conserve battery power when not in use. A rechargeable battery USB port 12 is also provided as part of the electronics of the integrated circuit board assembly. This USB port which may be a mini-USB port allows the lithium ion battery pack to be recharged while in the shoe. The antenna 8 is located on an outer plane of the circuit board assembly 2 away from the battery pack to avoid signal interference.

The antenna 8 is a Bluetooth enabled receiver antenna compatible with a sound source device 40 having a built in Bluetooth enabled transmitter antenna. For older hand held devices not having Bluetooth enabled built in antenna, a Bluetooth enabled audio adaptor transmitter antenna 18 (shown in FIG. 14) is plugged into a UBS port or mini-port of the hand held device 40. Antenna 8 extends in the length direction of the footwear or in another direction such as the width direction of the footwear.

One compatible plug-in audio adapter antenna is the Audioengine W1 (AW1) premium wireless audio adapter antenna. This Bluetooth enabled antenna can be used with any hand held audio device having an USB port. Audioengine also manufactures another premium transmitter antenna wherein the audio adapter transmitter antenna docks with an iPhone® or iPod®. Both audio adaptor transmitter antennas have a range of 100 feet. Other known in the art transmitter and receiver antenna adapters may be used. The receiver antenna is made integral as part of the circuit board assembly.

Figure 14:
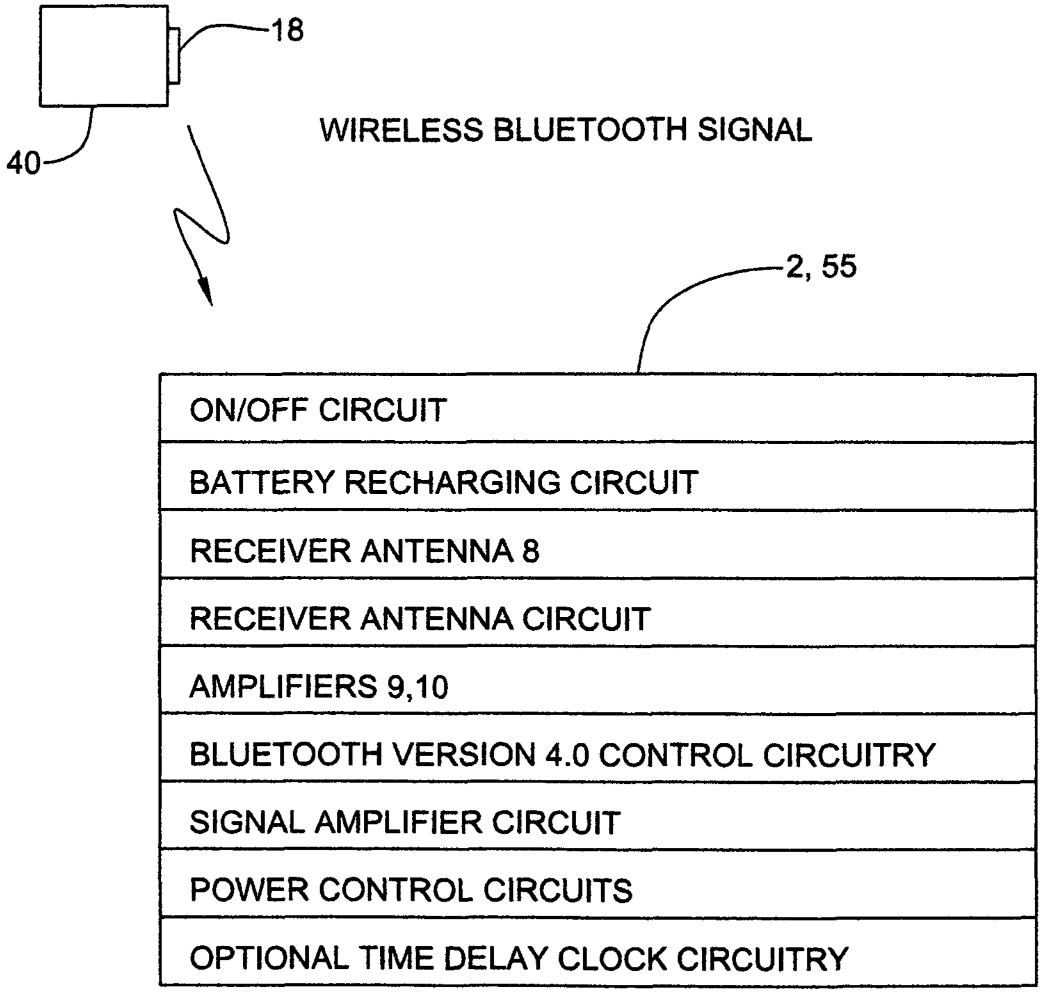
FIG. 14 is a logic diagram showing a Bluetooth enabled hand held sound source in wireless communication with the circuit board assembly shown in the above depicted embodiments.

The hand held audio device 40 shown in FIG. 14 is equipped with a plug in audio transmitter antenna 18 capable of sending a Bluetooth version 4 wireless signal generated by device 40 to the audio adaptor receiver antenna 8 of the circuit board 2. As previously noted this signal is amplified by one amplifier or multiple amplifiers 9 and 10 which send the amplified signals on to the shoe mounted mini-speakers 6 and 7.

The integrated circuit board 2 and battery pack having batteries 3 and 4 are illustrated in an exploded view in FIG. 3 with the power pack and the integrated circuit board assembly connected by interface 20. Water proof shock absorbing material such as foam 28 encases the circuit board assembly when placed in its hidden shoe cavity as a protective feature of the invention. Other water proof and shock protection material may also be used as a substitute or in addition to foam.

The circuit board assembly 2 mounts compatible micro-electronic circuitry to accept Bluetooth wireless protocol signals. Bluetooth® is a proprietary open wireless technology standard for exchanging data over short distances by using short wavelength transmissions operating in the 2.4 GHz frequency band from fixed and mobile devices. Bluetooth is managed by the Bluetooth Special Interest Group. In the preferred embodiment the circuitry incorporates Bluetooth version 4.0 specifications known as the Bluetooth Core Specification Version 4.0. This version has been found ideal for this invention which employs low energy, short range wireless signals. The Bluetooth Core Specification version 4.0 includes Classic Bluetooth, Bluetooth high speed and Bluetooth low energy protocols. Those skilled in the art would recognize that other earlier Bluetooth protocols are also suitable for use with this invention.

A design variation (not shown) of the circuit board assembly 2 uses a short audio adapter receiver antenna extending in the width direction of the heel with the on/off switch connection 11 and the USB port 12 placed at a side edge of the circuit board rather than at the rear edge. The amplifiers 9 and 10 are located on the circuit board assembly before and after the shorter antenna. A battery pack similar to that shown in FIG. 3 is located beneath the circuit board assembly in a cavity in the heel of the shoe. Water proof shock absorbing material such as foam encases the circuit board assembly.

Figure 4:
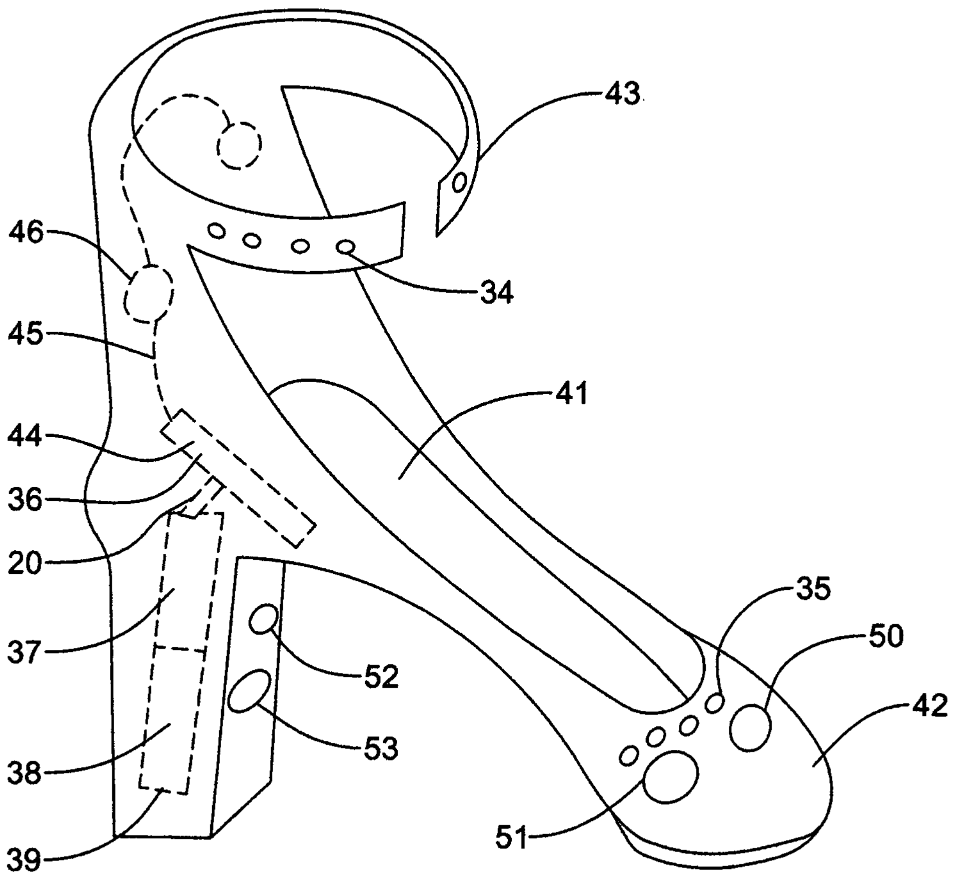
FIG. 4 is a perspective view of a stylish woman's shoe depicting an angled circuit board assembly 2 mounted in a hidden cavity below the sole of the shoe being powered by a stacked battery pack having batteries 37, 38 mounted in a hidden cavity of the high heel of the shoe.
Figure 5:
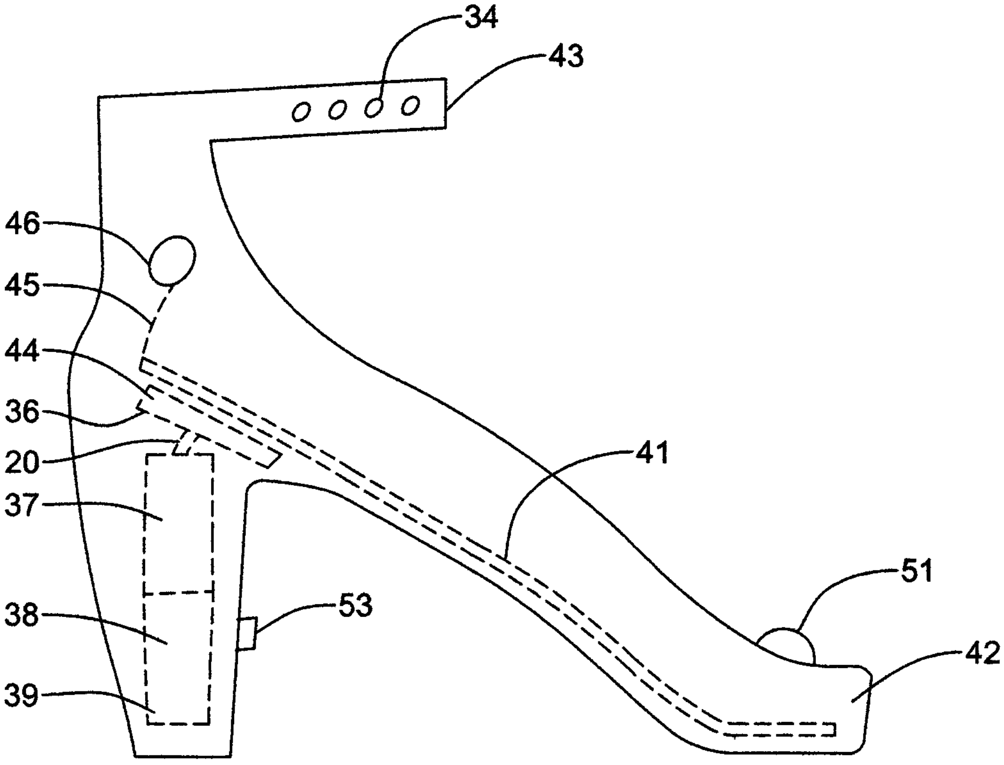
FIG. 5 is a side view of a right side of the mating shoe of FIG. 4 depicting a similarly hidden angled circuit board 44 and stacked batteries.

FIGS. 4 and 5 teach application of the principles of the present invention to an embodiment for a women's stylish shoe such as French buttoned shoes. A shoe ankle collar 43 mounts a vertical row of decorative buttons 34 with a second decorative button row 35 extending parallel to the toe of the shoe 42 shown in FIG. 5. A strip such as a hook and loop strip connection (not shown) opens and locks the collar 43 to the wearer's ankle. A circuit board assembly 44 having integrated therein all the elements of the FIG. 2 circuit board assembly is placed in a cavity 36 at an angle compatible with the plane of the underside of the sole pad 41 of the shoe 42. The multi-planed integrated circuit board is encased in a water proof shock absorbing material such as foam.

A lithium ion battery pack having batteries 37, 38 stacked vertically on top of each other is placed in a cavity 39 in the heel shank of the shoe 42 below the circuit board assembly 44 which battery pack connects with the bottom of one end of the angled circuit board by way of an interface 20. One wiring harness 45 extends from one amplifier 9 upwards as shown by a dashed line to a mini-speaker 46 mounted on one side of the ankle collar 43 of the shoe. A second mini-speaker (not shown) is mounted on or in the other side of the collar 43. This second mini-speaker also receives an amplified sound signal through the wiring harness 45. Front mini-speakers 50 and 51 are connected with the circuit board assembly by a second wiring harness 48 shown as a dashed line under the sole 49. The harnesses 45 and 48 provide a sound signal from the amplifiers integrated with the circuit board assembly 44 to the mini-speakers. These harnesses also provide power for the mini-speakers from the battery pack. If desired, the mini-speakers may have the appearance of the decorative buttons 34, 35. The circuit board assembly 44 has a USB power port 52 at the front edge of the inside of the heel. The circuit board assembly also has an on/off switch connection 53 extending through the front edge of the inside of the heel.

If Bluetooth wireless signals are being sent to both shoes, circuitry of each circuit board is modified as explained earlier to have the internal clock circuitry for a slight time delay synchronous circuit creating a Bluetooth piconet with the source 40.

Optionally, only one shoe may mount the mini-speakers. The other shoe is provided with hidden weights (not shown) distributed beneath the sole pad 41. The weights placed in the shoe give a balanced feel to the shoe pair. This arrangement has the advantage of needing only one circuit board assembly and a set of mini-speakers used with just one shoe.

Figure 6:
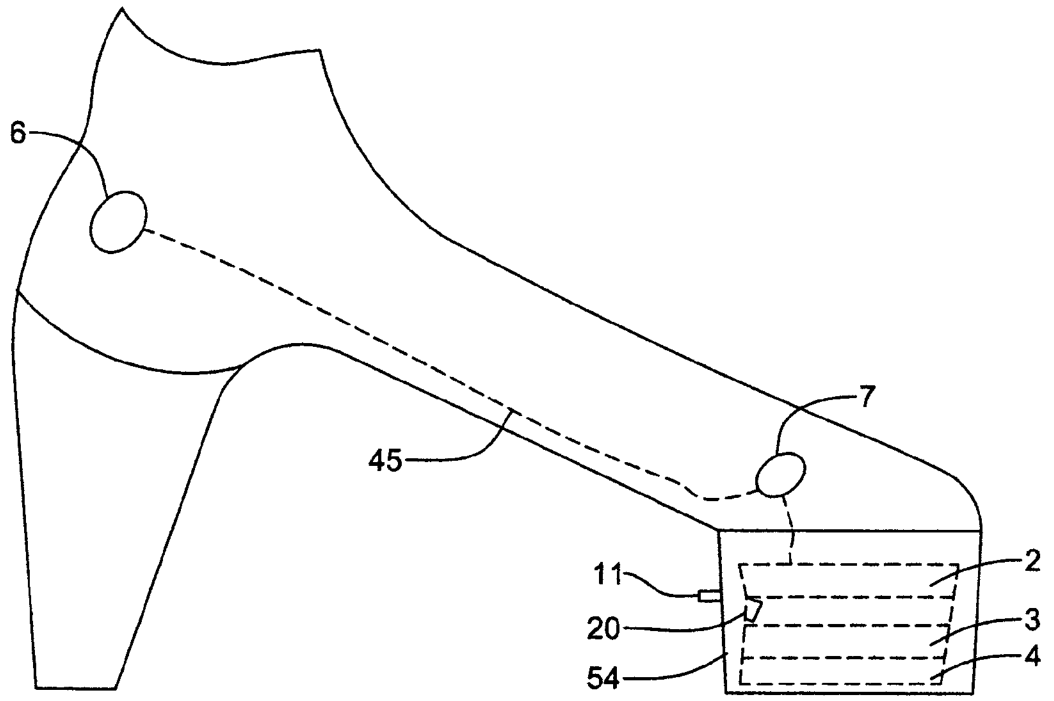
FIG. 6 is a side view of a variation of a stylish woman's shoe depicting the circuit board assembly and battery pack hidden at the front of the shoe in a raised toe block support.

FIG. 6 depicts a different embodiment of a woman's shoe wherein the circuit board assembly 2 and lithium ion battery pack having batteries 3, 4 are hidden in recesses or cavities in a raised toe support block 54 located below the forward portion of the shoe's sole. As with the other disclosed embodiments, mini-speakers may be mounted at the front of the shoe on each side or just along one outer side. In this embodiment, the on/off switch 11 and USB battery recharge port 12 are located at the rear wall of the raised toe block 54. As with all the other embodiments disclosed, a water proof shock absorbing material such as foam encases the circuit board assembly. As previously disclosed, each shoe may have a modified circuit board assembly for creating a Bluetooth piconet where maximum stereo effect is desired. Clock controlled signals allow adjustment for signal skewing between the mini-speakers and the hand held music source 40. A less costly alternative to use of two circuit board assemblies is to have one non-music playing shoe outfitted with hidden weights (not shown) to achieve a comfortable balanced weight feel for the shoe pair.

Figure 7:
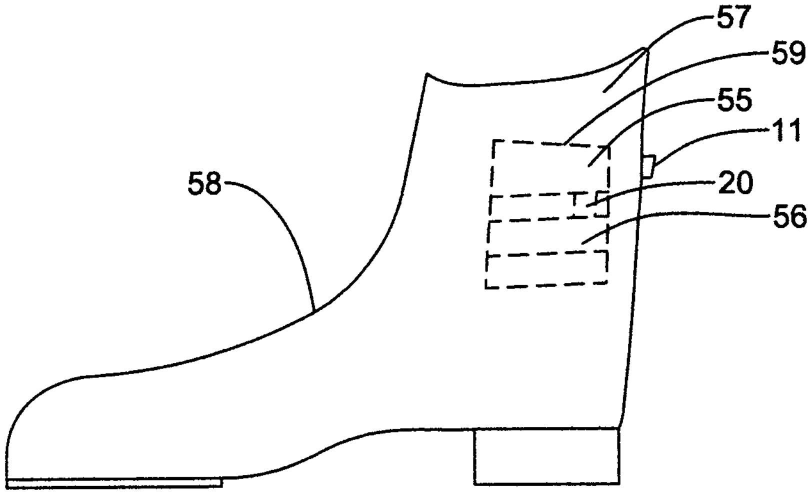
FIG. 7 is a side view of another shoe embodiment in the form of a boot showing both a curved vertical circuit board assembly and a curved vertical battery pack mounted in hidden recesses on the upper heel wall extending above the sole of the boot.
Figure 8:
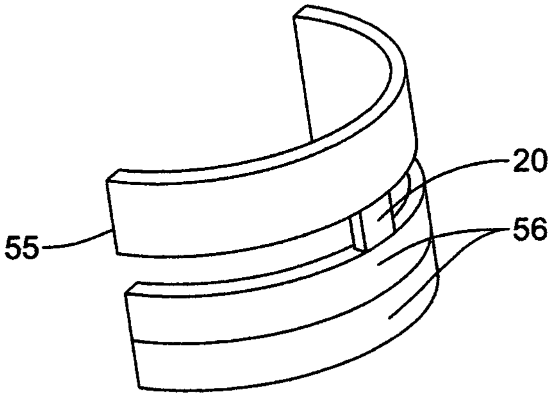
FIG. 8 is a perspective view of the curved circuit board assembly and battery pack of the boot of FIG. 7 removed from the hidden recess of the boot.

Another shoe embodiment, this time in boot form, is illustrated in FIG. 7 which shows both a curved vertical circuit board assembly 55 hidden in a recess 59 of wall 57 above a curved vertical lithium ion battery pack 56 also hidden in recess 59 of wall 57. The curvatures of the circuit board and battery pack conform to the shape of the rear heel wall 57 extending above the sole of a boot 58. This has a key advantage over the other disclosed embodiments as the weight and walking pressures exerted by the boot wearer are considerably reduced. FIG. 8 best shows the curved contour of circuit board assembly 55 and battery pack 56 removed from the hidden wall recess 59. As previously pointed out, stereo sound effect can be achieved using mini-speakers on only one boot. Speakers on both boots require the internal clock control circuitry on the circuit board assembly to create the Bluetooth piconet as earlier explained. The circuit board assembly is encased in a water proof shock resistant material such as foam when placed in the hidden boot recess 59.

Figure 9:
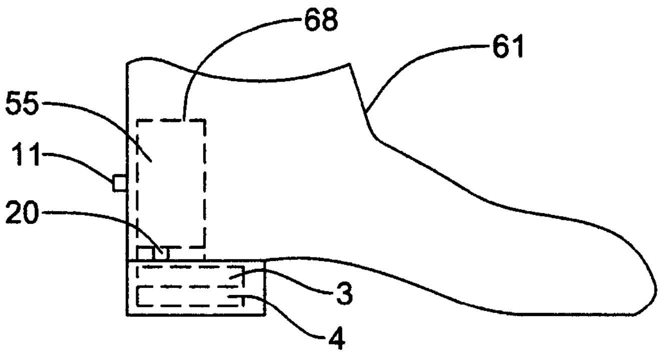
FIG. 9 is a side view of a low cut shoe embodiment having a curved vertical circuit board assembly in a hidden recess of a low cut upper heel wall with the battery pack located in a hidden recess in the heel.

FIG. 9 shows another embodiment used with a low cut shoe 61. A curved vertical circuit board assembly 55 is located in a hidden recess 68 in the upper wall of the shoe's heel above the sole of the shoe. The lithium ion battery pack having batteries 3, 4 is placed in a hidden recess 69 in the heel of the shoe as was the case with the FIG. 1 embodiment. An interface 20 connects the circuit board assembly and the battery pack as previously explained in the FIG. 1 embodiment. As explained previously, digital stereo sound waves can be played by mini-speakers on only one shoe or on both shoes of the shoe pair. A protective water proof shock resistant material such as foam encases the circuit board assembly when placed in its shoe recess 68.

Figure 10:
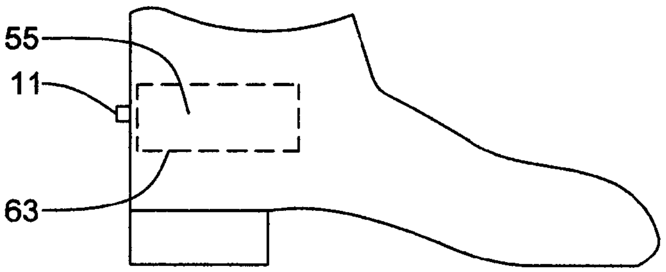
FIG. 10 is a side view of a variation of the low cut shoe of FIG. 9 showing a curved vertical circuit board assembly hidden in a recess located in the vertical heel wall above the sole of the shoe.
Figure 11:
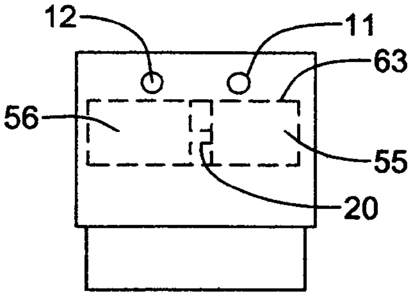
FIG. 11 is a rear view of the shoe of FIG. 10 showing the hidden recess wrapping around the rear wall and mounting a curved vertical battery pack in the right half of the recess with the circuit board assembly mounted in the left half of the hidden recess.

FIGS. 10 and 11 depict another embodiment of a low cut shoe wherein a rear upper heel wall has a rear wrap around recess 63 housing a vertical curved circuit board assembly 55 in one side of the recess and a curved vertical battery pack 56 in the other half of the recess 63. As previously pointed out, stereo sound waves can be achieved using mini-speakers on only one shoe or on both shoes of the shoe pair. A curved circuit board assembly 55 is encased in a water proof shock resistant material such as foam. FIG. 11 is a back view showing the circuit board assembly recess portion on the left side of the shoe and the power pack recess portion on the right side. An on/off switch 11 and a UBS recharging port 12 are located at the rear heel's wall.

Figure 12:
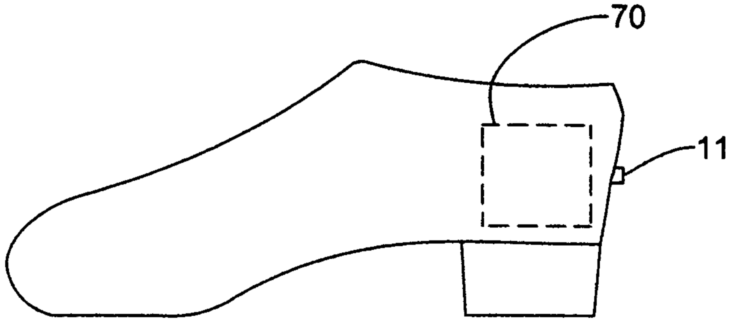
FIG. 12 is a side view of another shoe embodiment having a curved vertical circuit board assembly placed in front of a curved vertical battery pack both mounted in a hidden recess in the upper heel wall above the sole of the shoe.
Figure 13:
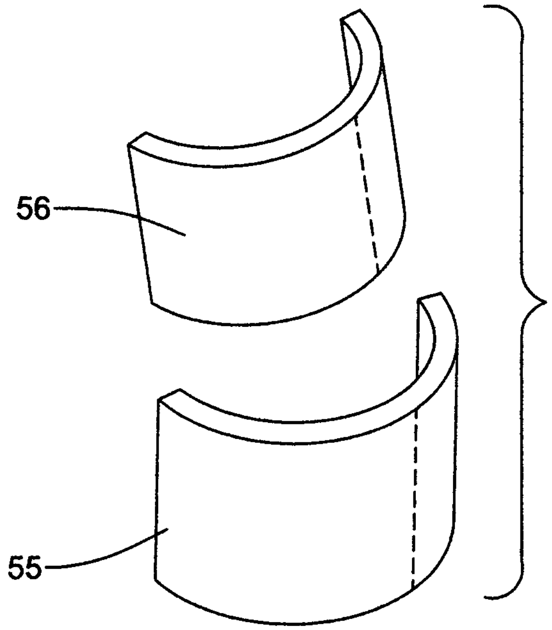
FIG. 13 is a perspective view of the FIG. 12 circuit board assembly and battery pack removed from the hidden recess showing their overlapping relationship.

Another embodiment of a low profile shoe is illustrated in FIGS. 12 and 13. A curved vertical circuit board assembly 55 overlaps a curved vertical lithium ion battery pack 56 in a hidden recess 70. It is preferred to place the circuit board assembly close to the upper heel rear wall behind the battery pack above the shoe's sole for easier access to an on/off switch 11 and the USB recharge port 12 (not shown). Mini-speakers and their placement on the shoe pair may be selected as described in the previous embodiments. Protective encasement material for the circuit board assembly is the same as previously set forth.

FIG. 14 is a logic diagram outlining the invention. A hand held Bluetooth enabled music source 40 having a built in transmitter antenna or a suitable audio adapter transmitter antenna 18 wirelessly transmits a short range music signal to the audio adaptor receiver antenna 8 embedded with the circuit board assembly 2, 55 which can be flat or curved. The transmitter antenna 18 has appropriate Bluetooth version 4.0 protocol circuitry used to send Bluetooth wireless sound signals over a short distance from the hand held source to receiver antenna 8. One or more amplifiers 9, 10 boost the signal from the circuit board assembly to multiple mini-speakers to play the digital music generated from the source 40. Essential circuits in the integrated multi-plane circuit board assembly include an on/off circuit, a battery pack recharging circuit, an antenna receiver control circuit, a preferred Bluetooth version 4.0 protocol signal processing control circuit, one or more signal amplifier circuits and power control circuits to operate the receiver antenna, the amplifiers and the mini-speakers. For certification purposes, those skilled in the electronics art would understand how to design and manufacture the integrated circuit board circuitry to ensure that the Bluetooth signal does not to interfere with other nearby communication devices, does not cross talk with another pair of speaker shoes and does not interfere with medical devices such as heart pacers or hearing aids. The circuit board assembly of this invention has other circuitry meeting wireless stereo Bluetooth profiles for AZDP (advanced audio distribution profile)/AVRCP (Bluetooth remote control). An ISM frequency band of 2.4 GHz-2.48835 GHz is used. The circuit board assembly is manufactured to meet applicable IEEE, CE, FCC, IC certification standards and Bluetooth end-product protocols which are well known in the art.

One form of mini-speakers useful in this invention includes the well known magnetic coil generating a varying magnetic field fixed to a voice coil and a cone to control the vibrations of the cone to create air pressure carried sound waves.

Figure 15:
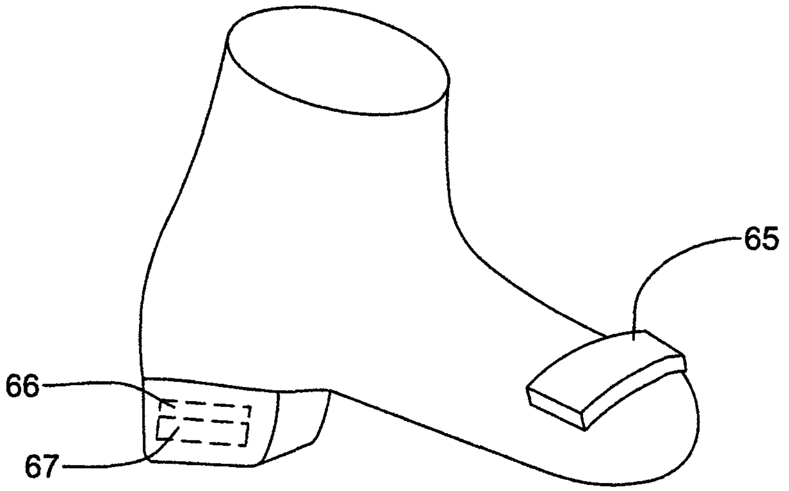
FIG. 15 is a perspective view of a shoe mounting a thin blanket flexible flat mini-speaker using a multi-sized, multi-pored diaphragm to emit stereo like sound.

FIG. 15 depicts another embodiment of a mini-speaker wherein shoe 64 has a thin flexible flat loudspeaker 65 adhered to the top front surface of the toe portion. This embodiment uses the FleXpeaker® paper thin speaker system described in the earlier noted Tseng et al U.S. Patent Application Publication No. 2012/0166230, the disclosure of which publication is herein incorporated by reference. A modified integrated multi-layer circuit board assembly 66 is located in a hidden recess of the shoe's heel as is a lithium ion battery pack 67. The multi-layer integrated circuit board assembly 66 is modified in a manner known to those skilled in the art to control dc and ac voltage signals to the electrodes (not shown) and pores of a vibrating diaphragm (not shown)

of the speakers of the FleXpeaker® system. Miniature subwoofers (not shown) can be added to improve bass frequency response. As with the other embodiments, each shoe of the pair may mount a flexible flat speaker 65.

Figure 16:
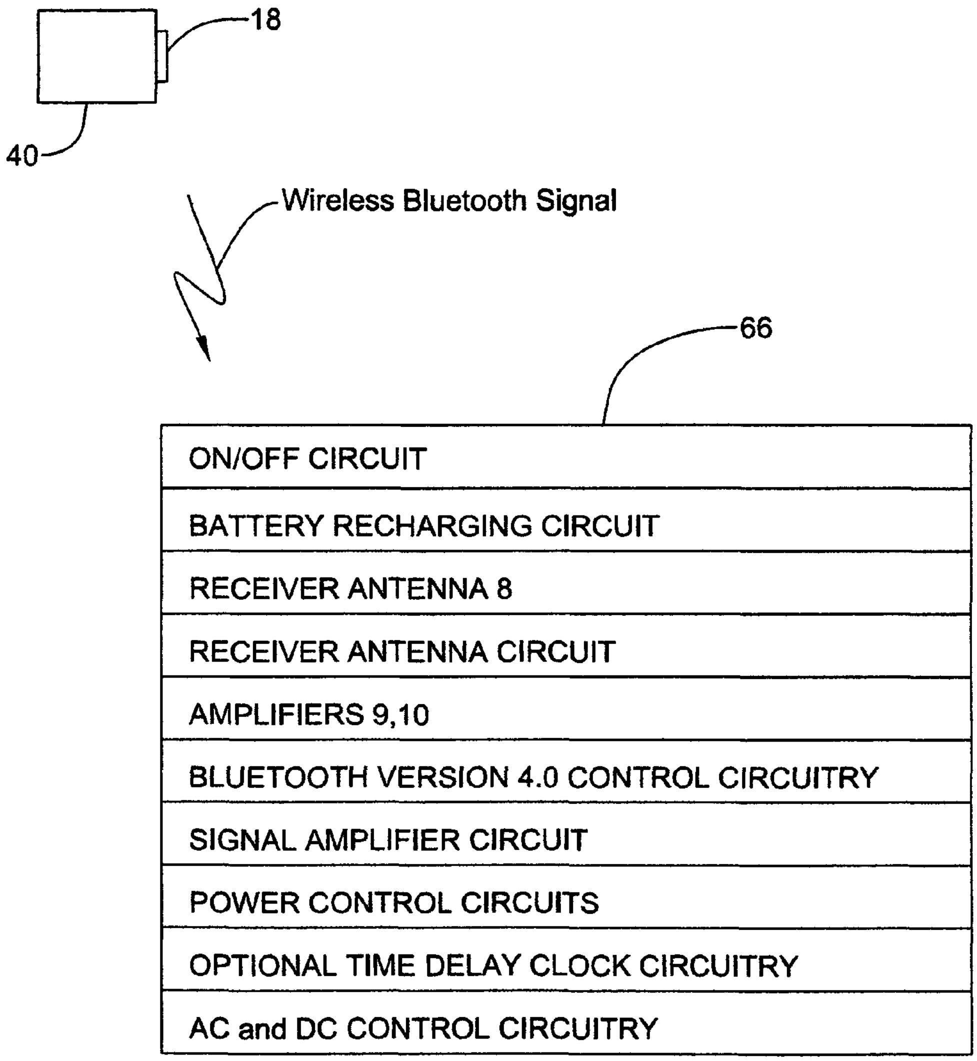
FIG. 16 is a logic diagram showing a Bluetooth enabled hand held sound source transmitting signals to a modified integrated multi-layer circuit board assembly used with the flexible flat mini-speaker of FIG. 15.

FIG. 16 is logic diagram of the FIG. 15 embodiment. A hand held Bluetooth enabled music device 40 having a built in Bluetooth protocol transmitter antenna or audio adaptor transmitter antenna 18 wirelessly transmits a short range digital music signal to the audio adapter receiver antenna embedded with the circuit board assembly 66. This frequency signal is decoded and converted to voltage control signals used by the electrodes and diaphragm within the speaker to cause pore vibration in the diaphragm of the flexible flat speaker 66. Essential circuits for the flat flexible speaker include an on/off switch circuit, a rechargeable battery circuit, an antenna receiver circuit, Bluetooth version 4.0 protocol circuits, decoder/converter circuits, amplifier circuits, dc and ac voltage control circuits and optionally a subwoofer circuit.

Recently a newer type of lithium ion battery compatible with the present invention has been developed by researchers at Rice University using silicon wafers containing microscopic pores that increase the storage capacity for batteries. The anode or negative side of the common lithium ion battery is made of graphite holding the lithium. It has been reported that storage of lithium is greatly increased by the substitution of silicon wafers. Microscopic micron-sized pores are manufactured into the silicon wafers to aid the silicon in its expansion and contraction as lithium is stored and released. The pores solve the problem of premature wafer breakdown and cracking after a few cycles of use. Common lithium ion batteries hold about 300 milliamp hours per gram of carbon based anode material. The newer type lithium ion silicon wafer battery is expected to hold ten times this amount. This newer type has a reported 200 to 250 charge-discharge cycle range and is the preferred battery for use with all the embodiments of the present invention.

Another newer type lithium ion battery compatible with the present invention has recently been developed by researchers at Stanford University. This battery replaced the carbon (graphite) anodes with anodes of silicon nanowires. One design uses silicon nanowires with a core shell structure consisting of a center solid wire surrounded by a cylindrical shell similar to a coaxial cable. The core is a crystalline structure with the shell's nanowires having an amorphous structure. This battery also has an improved charge-discharge cycle range and can hold ten times the charge of the conventional lithium-ion battery.

While reference has been made to a battery pack in the above descriptions, it should be understood that a single larger battery may also be substituted.

Although various separate functional blocks have been shown in the figures for purposes of illustration and instruction, it is to be understood that at least some of their functionality described herein may be integrated within a common integrated circuit package or distributed among more than one integrated packages.

In the drawings and specification, there have been disclosed exemplary embodiments of the invention. However, many variations and modifications can be made to these embodiments without substantially departing from the principles of the present invention. Accordingly, although specific terms are used, they are used in a generic and specific sense only and not for purposes of limitation, the scope of the invention being defined by the following claims.

What is claimed is:

1. A pair of footwear comprising plural mini-speakers mounted on at least one of the footwear of the pair, an integrated multi-planar thin circuit board assembly mounted in a hidden recess in at least one of the footwear of the pair, a thin rechargeable battery pack mounted in a hidden recess adjacent the circuit board assembly hidden recess, an amplifier integral with the circuit board assembly, a digital signal wireless receiver antenna integral with the circuit board assembly, a battery power on/off switch forming part of the circuit board assembly, a USB power access port forming part of the circuit board assembly to permit recharging the battery pack while in the battery pack recess of the footwear, Bluetooth protocol enabled circuitry forming part of the circuit board assembly which Bluetooth circuitry processes wireless digital sound signals received by the receiver antenna from a source external to the footwear and which Bluetooth circuitry sends an amplified digital sound signal from the amplifier to the mini-speakers.

2. The footwear of claim 1 wherein the recess mounting the integrated multi-planar thin circuit board assembly is formed to vertically accommodate the circuit board assembly and is located in a rear curved heel wall located above a sole of the footwear.

3. The footwear of claim 1 wherein the recess mounting the battery pack is formed to vertically accommodate the thin battery pack and is located in a curved heel wall located above a sole of the footwear.

4. The footwear of claim 1 wherein the hidden recess for the circuit board assembly is within a curved vertical heel wall extending above a sole of the footwear.

5. The footwear of claim 4 wherein the circuit board assembly is curved to conform to the curvature of the heel wall.

6. The footwear of claim 1 wherein the rechargeable battery pack is a lithium ion battery pack.

7. The footwear of claim 6 wherein each battery of the battery pack has an anode consisting of silicon wafers having nano pores therein to increase the number of charge/discharge cycles of each battery.

8. The footwear of claim 6 wherein each battery of the battery pack has an anode consisting of a silicon core-shell nano wire structure having crystalline silicon as the core and amorphous silicon wires as the shell.

9. The footwear of claim 1 wherein the footwear is in the form of a woman's high heel shoe with the hidden recess of the circuit board assembly located beneath an angled sole portion of a heel of the shoe and the hidden recess mounting the battery pack is elongated and located in a spiked heel of the shoe with the batteries of the battery pack stacked on top of each other in the elongated recess.

10. The footwear of claim 1 wherein the footwear is in the form of a woman's shoe having a raised block toe support mounted to the underside of a sole of the shoe with the hidden recess of the circuit board assembly located within the raised block toe support and the hidden recess mounting the battery pack also located within the raised block toe support.

11. The footwear of claim 1 wherein the Bluetooth protocol enabled circuitry uses Bluetooth version 4.0 protocol.

12. The footwear of claim 1 wherein one of the footwear has hidden weights distributed throughout the one footwear so as to give a comfortable balanced feel to the one footwear as compared with the other footwear of the pair.

13. The footwear of claim 1 wherein the circuit board assembly is encased in a protective shock resistant and waterproof material when mounted in the recess for the circuit board assembly.

14. A pair of footwear comprising at least one thin flexible flat speaker mounted on at least one of the footwear of the pair, an integrated multi-planar thin circuit board assembly mounted in a hidden recess in at least one of the footwear of the pair, a thin rechargeable battery pack mounted in a hidden recess adjacent the circuit board assembly hidden recess, an amplifier integral with the circuit board assembly, a digital signal wireless receiver antenna integral with the circuit board assembly, a battery power on/off switch forming part of the circuit board assembly, a USB power access port forming part of the circuit board assembly to permit recharging the battery pack while in the battery pack recess of the footwear, Bluetooth protocol enabled circuitry forming part of the circuit board assembly which Bluetooth circuitry processes digital wireless sound signals received by the receiver antenna from a source external to the footwear and which Bluetooth circuitry sends to the amplifier a digital sound signal for use by the at least one flat flexible speaker.

15. The pair of footwear of claim 14 wherein the thin flexible flat speaker uses an electret vibrating diaphragm film having pores of micro meter or nanometer diameter to generate sound waves.

16. The pair of footwear of claim 14 wherein each speaker includes a thin membrane having micron to nano sized pores and the circuit board assembly includes circuitry to control voltage signals applied to electrodes within each speaker to vibrate the pores of the membrane to produce digital sound.

17. The pair of footwear of claim 14 wherein the Bluetooth protocol circuitry uses Bluetooth version 4.0 protocol.

18. The pair of footwear of claim 14 wherein the hidden recess for the circuit board assembly is within a curved vertical heel wall extending above a sole of the footwear and the circuit board assembly conforms to the curvature of the heel wall.

19. The pair of footwear of claim 14 wherein each battery of the battery pack has an anode consisting of either silicon wafers having nano pores for lithium ion storage or a silicon core-shell nano wire structure having crystalline silicon as the core and amorphous silicon nano wires as the shell.

20. An audio distribution system including a Bluetooth piconet comprising the combination of a hand held Bluetooth enabled digital music source having a wireless Bluetooth signal transmitter antenna and a footwear mini-speaker system wherein the footwear mini-speaker system comprises a pair of footwear mounting plural mini-speakers thereon, an integrated thin multi-planar circuit board assembly mounted in a hidden recess of at least one of the footwear of the pair, a thin rechargeable battery pack mounted in a hidden recess adjacent the hidden recess for the circuit board assembly, an amplifier integral with the circuit board assembly, a digital signal wireless Bluetooth transceiver antenna integral with the circuit board assembly, a battery power on/off switch integral with the circuit board assembly, a USB power access port forming part of the circuit board assembly permitting recharging the battery pack while in the battery pack recess of the footwear, Bluetooth protocol enabled circuitry forming part of the circuit board assembly which Bluetooth circuitry processes wireless digital sound signals transmitted by the transmitter antenna from the hand held source to the transceiver antenna and which Bluetooth circuitry sends an amplified digital sound signal from the amplifier to the mini-speakers and a local time delay clock circuit integral with the Bluetooth circuitry to maintain periodic synchronization of the start of data received by the Bluetooth transceiver in each mini-speaker circuit board assembly and compensate for relative skew over time of each clock circuit.

* * * * *